United States Patent
Kanai

(10) Patent No.: US 7,612,900 B2
(45) Date of Patent: Nov. 3, 2009

(54) IMAGE FORMING SYSTEM, JOB PROCESSING METHOD, AND PROGRAM

(75) Inventor: Yasunori Kanai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 834 days.

(21) Appl. No.: 11/223,732

(22) Filed: Sep. 9, 2005

(65) Prior Publication Data

US 2006/0055954 A1    Mar. 16, 2006

(30) Foreign Application Priority Data

Sep. 10, 2004    (JP) .............................. 2004-264597

(51) Int. Cl.
*G06F 15/00*    (2006.01)
*G06F 21/00*    (2006.01)

(52) U.S. Cl. ...................................... 358/1.14; 711/163

(58) Field of Classification Search ................ 358/1.14, 358/1.13, 1.1, 474, 437, 404, 402, 444, 296; 711/101, 115, 163, 162, 165, 103; 400/76; 705/408, 410, 411; 399/87
See application file for complete search history.

(56) References Cited

U.S. PATENT DOCUMENTS

2002/0051167 A1* 5/2002 Francis et al. .............. 358/1.14
2002/0135816 A1* 9/2002 Ohwa ......................... 358/474

* cited by examiner

*Primary Examiner*—Saeid Ebrahimi Dehkordy

(74) *Attorney, Agent, or Firm*—Cowan, Liebowitz & Latman, P.C.

(57) ABSTRACT

This invention prevents data in a storage unit from being held without being erased against user's will after image formation. To this end, information that pertains to an image forming apparatus of an image forming system which includes the image forming apparatus which can execute print processing of data stored in a storage unit is confirmed. When the image forming apparatus is the one having a predetermined function, the image forming apparatus is permitted to execute print processing of data in the storage unit.

11 Claims, 13 Drawing Sheets

FIG. 11

PRINT DATA MAY REMAIN IN
TEMPORARY RECORD MEMORY

DO YOU WANT TO PROCEED TO PRINT ?

| YES | NO |

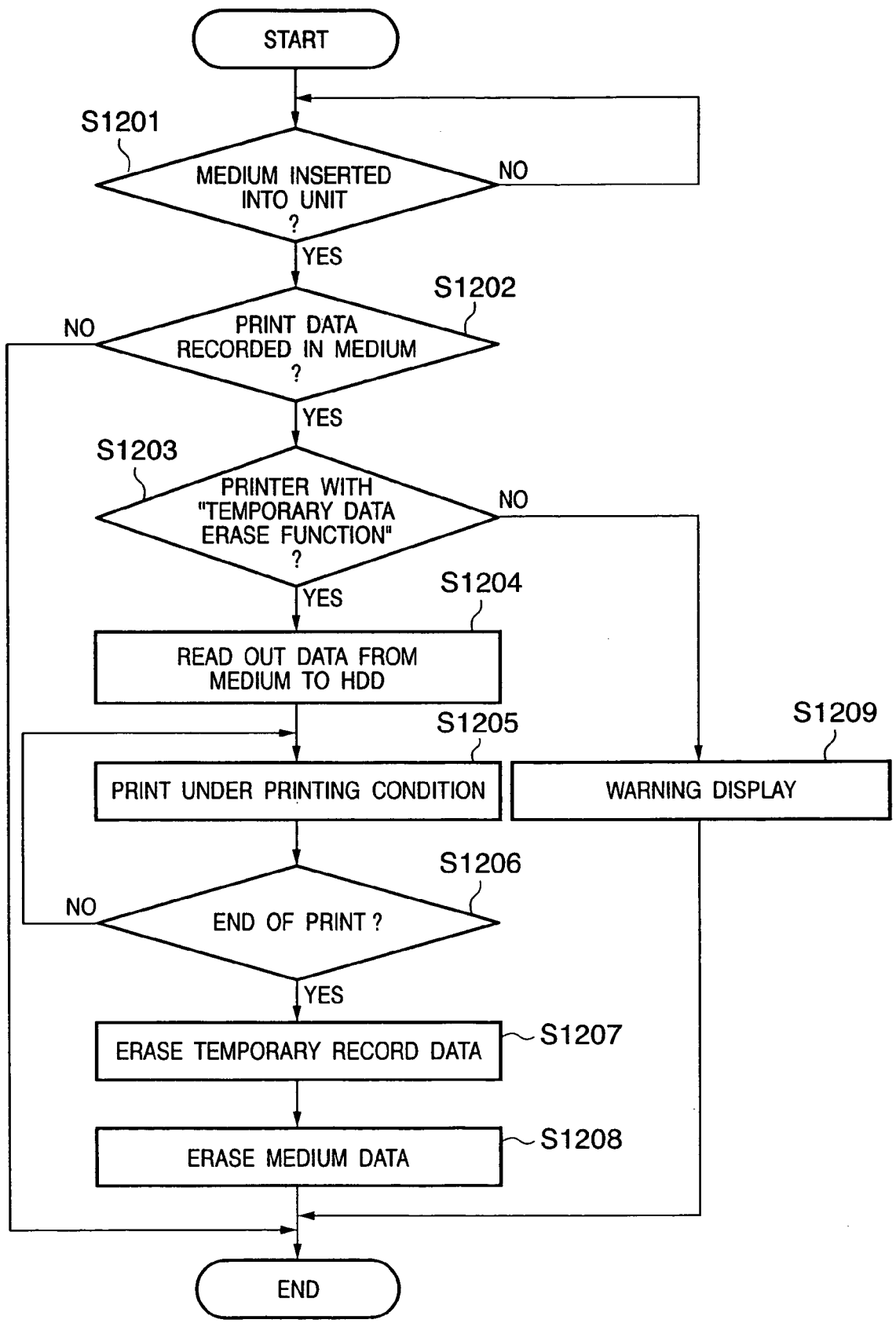

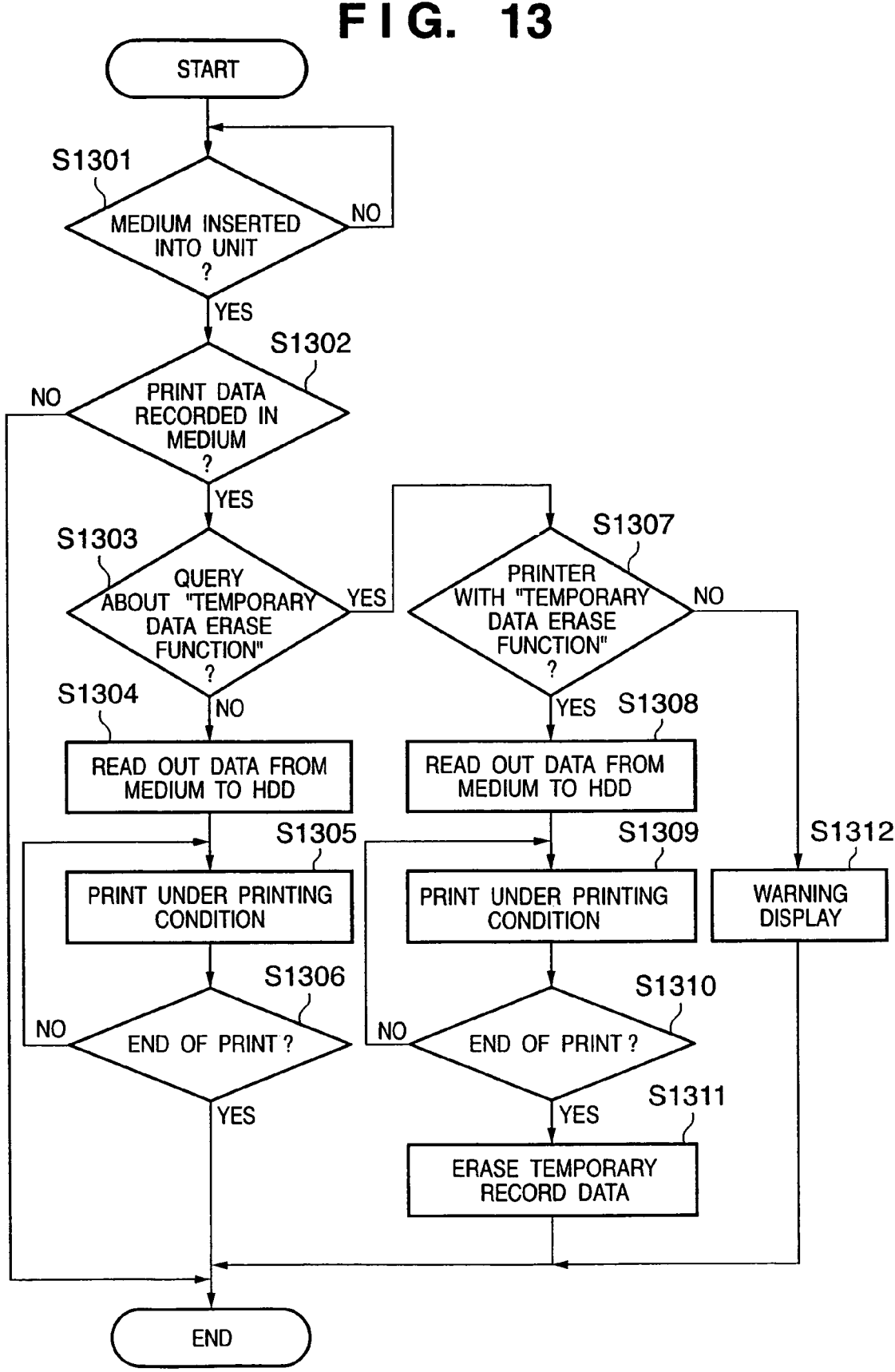

IMAGE FORMING SYSTEM, JOB PROCESSING METHOD, AND PROGRAM

FIELD OF THE INVENTION

The present invention relates to an information processing technique for executing print processing using data from a removable medium.

BACKGROUND OF THE INVENTION

In recent years, direct print processes from removable media have been proposed in the market of digital copying machines. The direct print process is a print mode in which a removable medium that records print data is inserted into a removable media drive unit and the recorded print data are printed at that place.

According to this mode, print processing can be readily done without using any PC wherever a digital copying machine compatible to removable media is equipped (e.g., a digital copying machine in an office, a print shop at a place where one has gone, and the like). In this manner, the print mode in which the user brings a removable media to a place where a digital copying machine is equipped, and prints data at that place is suited to a digital copying machine which uses the electrophotography technique with a short processing time period from the data input until the data output, and is also convenient for the user. Unlike in a conventional print mode in which the user transmits print data from a client PC to a digital copying machine and goes to that digital copying machine for the printed print product, since the print product is printed in user's sight, troubles such as loss of a print product, leakage of a print product to a third party, and the like can be prevented.

However, many recent digital copying machines execute processing after they temporarily save print data in their temporary recording devices (HDD, memory, or the like) upon executing the print processing. For this reason, the temporarily saved print data is left without being erased against user's will. The same problem is posed in the direct print process using removable media, and print data that has undergone the direct print process includes the risk of leakage to a third party.

SUMMARY OF THE INVENTION

The present invention has been made in consideration of the above problems, and has as its object to prevent data read out from a removable medium from being held without being erased against user's will after image formation using that data.

In order to achieve the above object, an image forming system according to the present invention comprises the following arrangement. That is, an image forming system including an image forming apparatus which can execute print processing of data stored in a storage unit, comprising:

a confirmation unit configured to confirm information that pertains to the image forming apparatus; and a controller configured to permit an execution of the print processing of data of the storage unit by the image forming apparatus, in case where the image forming apparatus is an image forming apparatus having a predetermined function.

Upon performing image formation using data read out from a removable medium, that data can be prevented from being held without being erased against user's will after image formation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 shows a UI of the image forming apparatus in the image forming system according to the second embodiment of the present invention;

FIG. 12 is a flowchart showing the flow of processing in the image forming system according to the third embodiment of the present invention; and FIG. 13 is a flowchart showing the flow of processing in the image forming system according to the fourth embodiment of the present invention.

DETAILED DESCRIPTION OF THE PREFERRED EMBODIMENTS

Preferred embodiments of the present invention will now be described in detail in accordance with the accompanying drawings.

In the following description, "removable media" mean external recording devices from which a disk part can be detached and exchanged, such as a floppy disk®, magnetooptical disk, Zip, removable hard disk, and the like.

First Embodiment

[Overview of System]

Figure 1:
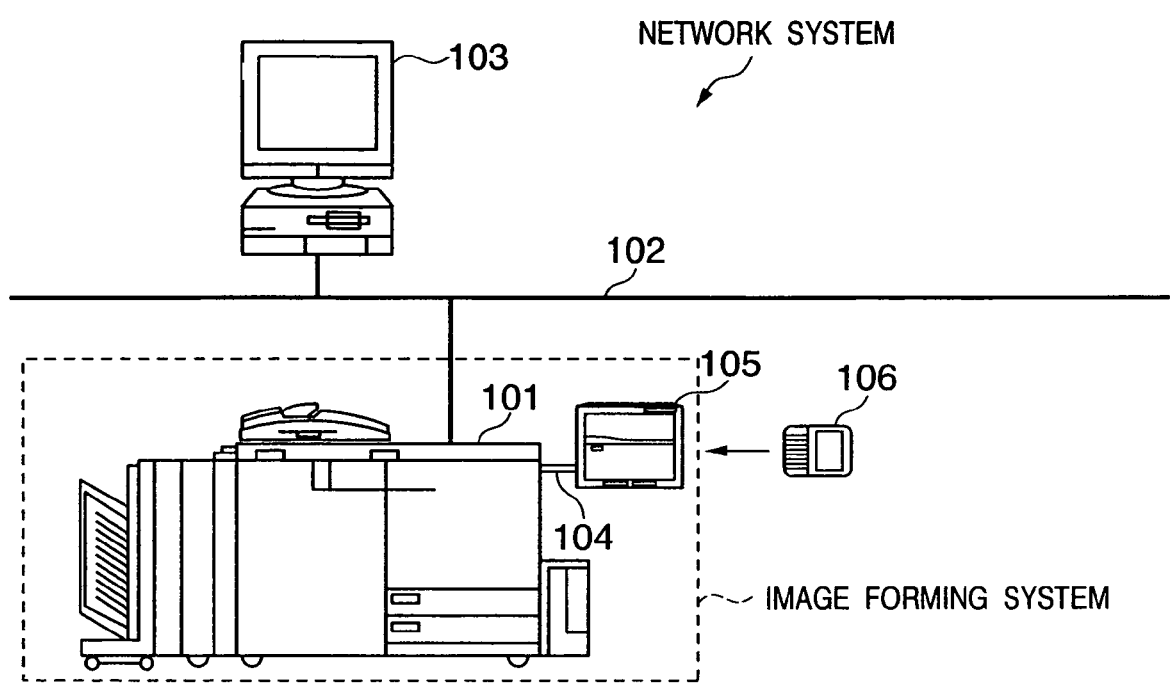
FIG. 1 is a diagram showing the arrangement of a network system which comprises an image forming system according to an embodiment of the present invention.
Figure 2:
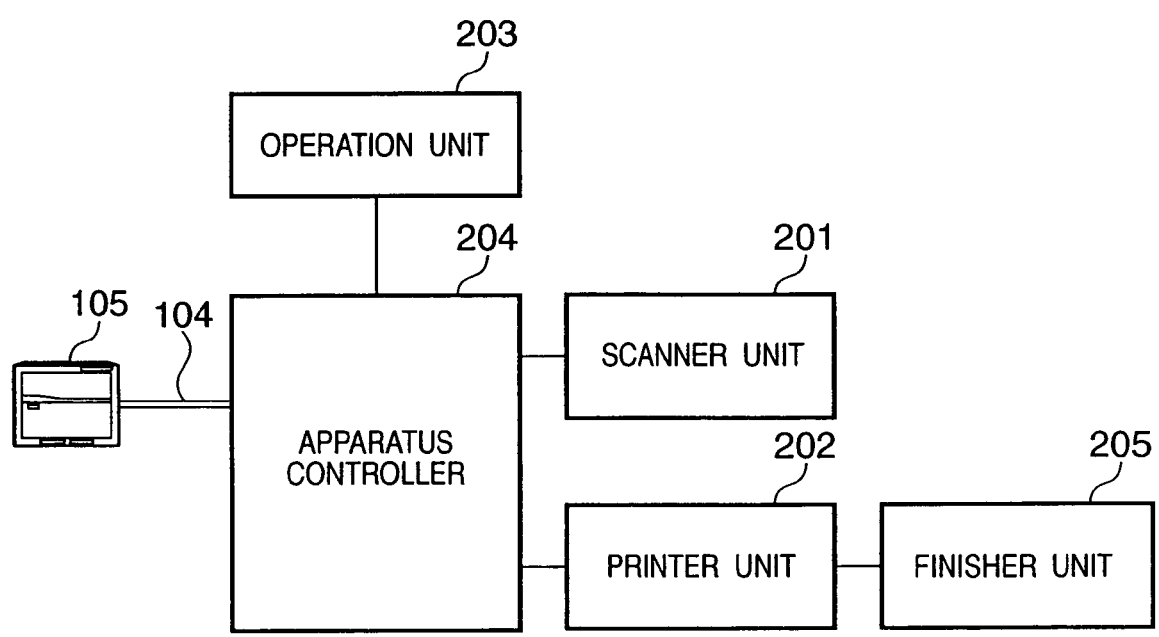
FIG. 2 is a block diagram showing the functional arrangement of the image forming system according to the embodiment of the present invention.

FIG. 1 shows the arrangement of a network system which comprises an image forming system according to an embodiment of the present invention, and FIG. 2 shows the functional arrangement of the image forming system according to the embodiment of the present invention. The function of this network system will be explained below using FIGS. 1 and 2.

An image forming apparatus 101 is a color scanner/printer apparatus which can scan or print full-color data, and is connected to a computer terminal 103 via a network 102, thus forming a network system.

A removable media drive 105 (information processing device) is connected to the image forming apparatus 101 via a communication cable 104, thus forming an image forming system. Since the removable media drive 105 is a unit that can read/write various removable media 106, the data input/output function of the image forming apparatus 101 by means of the removable media is expanded by connecting the removable media drive 105 to the image forming apparatus 101.

The image forming apparatus 101 has a scanner unit 201 and printer unit 202, and has a copy function of printing an image scanned by the scanner unit 201 using the printer unit 202. Also, the image forming apparatus 101 has an operation unit 203 which is used to instruct functions of the image forming apparatus 101, to make operation settings upon execution of the functions, and to display the status of the image forming apparatus 101 to the user.

The operations of the scanner unit 201 and printer unit 202 of the image forming apparatus, and the user instruction/status display from the operation unit 203 are processed by an apparatus controller 204 in the image forming apparatus 101. The apparatus controller 204 also executes processing of image data to be handled by the scanner unit 201 and printer unit 202, and data exchange processing with the removable media drive unit 105. The apparatus controller 204 executes all the operation control, status management, and image processing of the entire image forming apparatus 101. A finisher unit 205 that executes post-processing such as stapling and the like is connected after the printer unit 202.

Furthermore, this network system has a network printer function of transmitting a document created on the computer terminal 103 as PDL data to the image forming apparatus 101 via the network 102, and controlling the image forming apparatus 101 to render the received PDL data to image data, and to print that image data. At this time, the image forming apparatus 101 can render PDL data output from the computer terminal 103 to image data in one of two different color spaces, i.e., a Red/Green/Blue (RGB) color space or Cyan/Magenta/Yellow/Black (CMYK) color space using profiles used to attain color space conversion.

Moreover, this network system has a network scan function of displaying/saving an image scanned by the image forming apparatus 101 on the computer terminal 103. The network scan function is roughly classified into a pull scan function and push scan function depending on its operation modes. In the pull scan function, the user issues a scan instruction at the computer terminal 103. In the push scan function, the user issues a scan instruction at the operation unit 203 of the image forming apparatus 101. Hence, these functions are distinguished depending on different modes of issuing the scan instruction. Note that the image forming apparatus 101 can support both the pull scan/push scan modes. That is, the image forming apparatus 101 can scan a document image placed on the scanner unit 201 on the basis of an instruction from the user, and can transfer the scanned image to the computer terminal 103 via the network 102 in a format which is suited to be handled by the computer terminal 103.

The image forming apparatus 101 of this network system has an image quality adjustment function for the purpose of improving image quality in the printer unit 202 since it handles a full-color image. The image quality adjustment function is a function of reflecting the characteristics of the printer unit 202 in density adjustment values of the image processing of the apparatus controller 204 and allowing to print stable images by printing a prescribed image by the printer unit 202 and scanning that image by the scanner unit 201. Note that the prescribed image to be printed is generated by the apparatus controller 204.

[Arrangement of Apparatus Controller 204]

Figure 3:
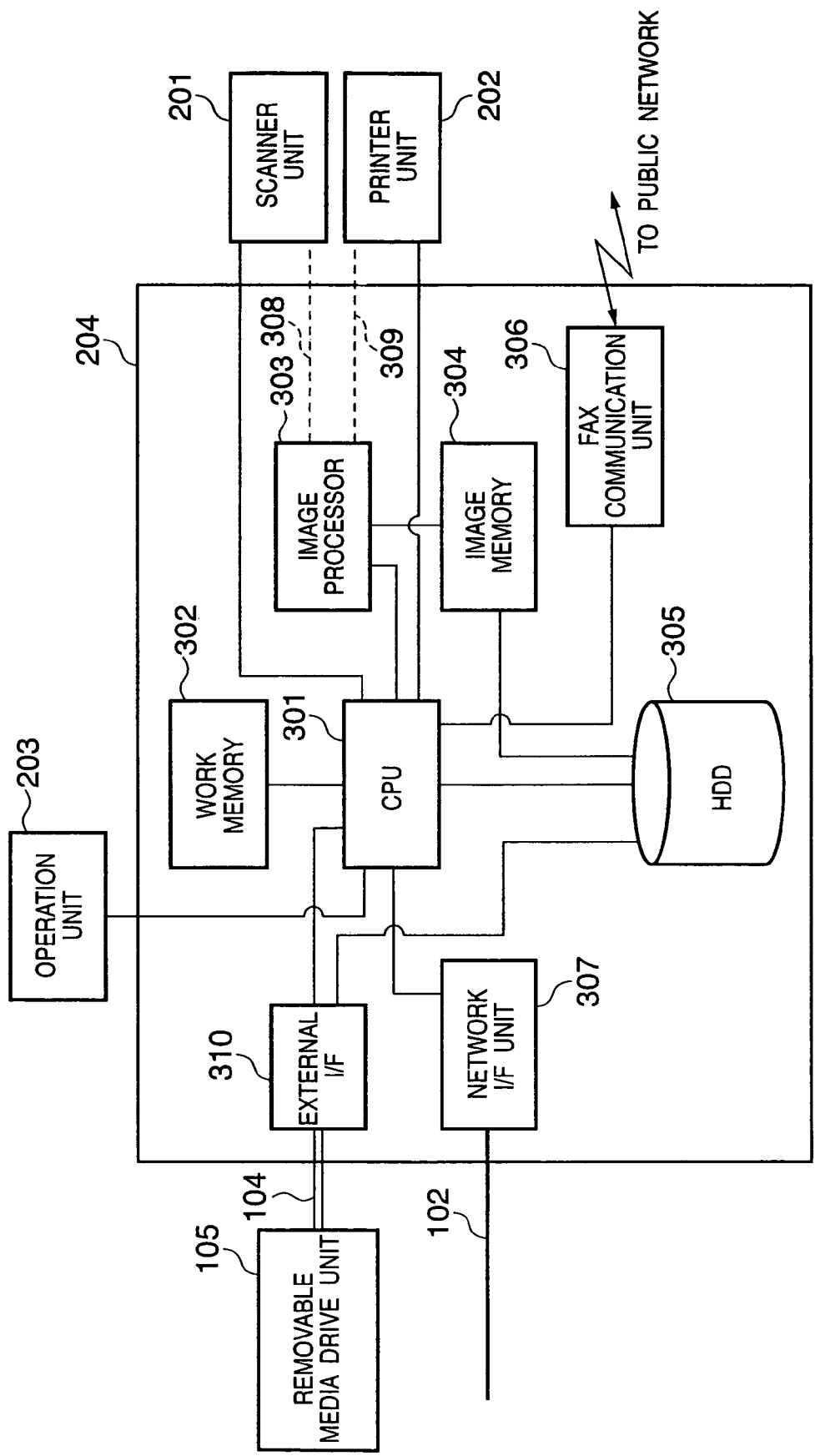
FIG. 3 is a block diagram showing the arrangement of a controller in an image forming apparatus.

The arrangement of the apparatus controller 204 will be described using FIG. 3. The apparatus controller 204 comprises a CPU 301, work memory 302, image processor 303, image memory 304, and large-capacity recording device (to be referred to as HDD hereinafter) 305. The image processor 303 is connected to the scanner unit 201 and printer unit 202 via image signal lines 308 and 309, respectively. The image processor 303 is also connected to the image memory 304, which is connected to the HDD 305. With this arrangement, image data from the scanner unit 201 can be recorded in the image memory 304 and HDD 305 via the image processor 303, or recorded image data can be output to the printer unit 202 via the image memory 304 and image processor 303 again.

Also, image data from the removable media drive unit 105 can be similarly recorded in the HDD 305 via an external I/F 310. Image data used in facsimile communications can be input/output to/from a facsimile communication unit 306. Furthermore, by exploiting the recording function of image data in the HDD 305, a function of recording image data input by the scanner unit 201 in the HDD 305 without printing them immediately, and printing/sending via facsimile the recorded image data on the basis of an instruction from the operation unit 203 when the user wants to print/send via facsimile that data, and a box function of sharing image data recorded in the HDD 305 among a plurality of users are available.

Moreover, a file transmission function is available. In this function, image data recorded in the HDD 305 is converted into image data (e.g., jpeg or the like) as a file format generally used in a computer terminal using the image memory 304 and image processor 303, and the converted file is sent to a desired computer terminal via a network interface unit 307 and the network 102 and is re-used at that computer terminal.

The CPU 301 operates according to programs recorded in the HDD 305 and also controls the operation unit 203. The CPU 301 controls processing units such as the facsimile communication unit 306 and the like, and makes communications required to attain synchronization of image data transmission/reception with the printer unit 202/scanner unit 201. Likewise, the CPU 301 accesses the network interface unit 307 to make communications with the removable media drive unit 105 via the internal network (communication cable) 104.

The apparatus controller 204 also provides a remote control service which allows the computer terminal 103 to refer to data recorded in the HDD 305 and the status of the apparatus via the network 102 by means of a Web service or the like, and also allows the computer terminal 103 to make various settings of the image forming apparatus 101.

[Operation Unit 203]

Figure 4:
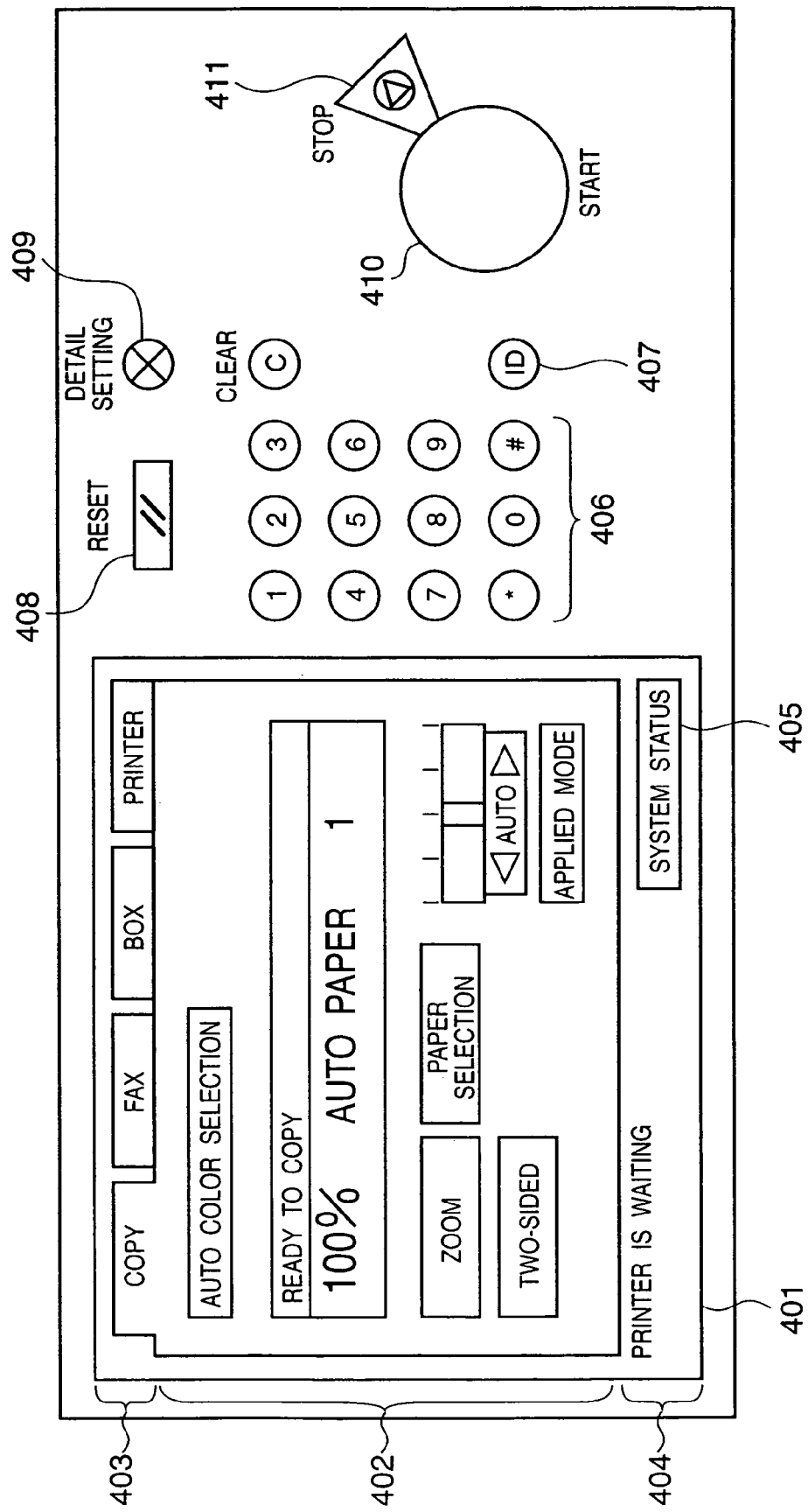
FIG. 4 shows the configuration of an operation unit of the image forming apparatus.

The operation unit 203 will be described below using FIG. 4. The operation unit 203 has an LCD display screen 401, which displays the settings and status of the image forming apparatus 101. FIG. 4 shows a copy dialog as an example of an operation setting dialog 402, and a paper source setting, the number of copies to be printed, and the like are displayed. The operation setting dialog 402 can be switched to the dialogs of facsimile and print functions via function keys 403. The LCD display screen 401 includes, on its lower portion, a status message display area 404 which displays the status of the image forming apparatus 101, and the status of the functions other than the selected function dialog, and also includes, on its lower right portion, a system status key 405 for displaying a dialog used to refer to details about the status of the image forming apparatus 101 and the status of the functions other than the selected function dialog.

In addition to the LCD display screen 401, the operation unit 203 has a ten-key pad 406 used to input numerical value settings. Also, the operation unit 203 has an ID key 407 used to display a dialog for inputting an ID that identifies the user who uses the copy function, facsimile function, and the like in the image forming apparatus 101. A reset key 408 is used to reset the operation setting dialog 402 to prescribed functions, and a detail setting key 409 is used to display a dialog used to make detailed operation settings of the image forming apparatus 101, network settings, and the like. A start key 410 and stop key 411 are buttons used to start and stop the operations of the respective functions.

[Structure of Scanner Unit 201]

Figure 5:
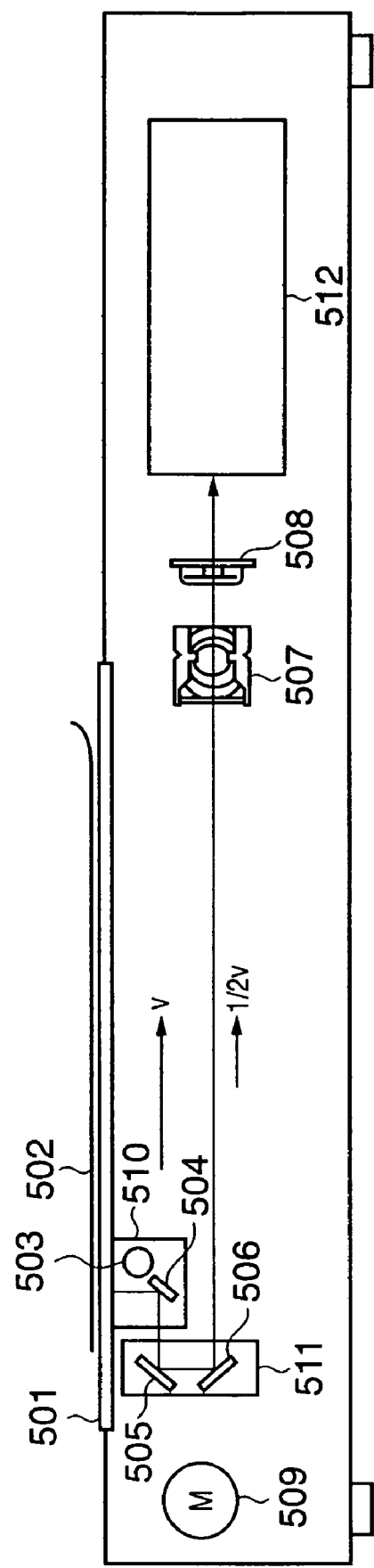
FIG. 5 is a sectional view showing the structure of a scanner unit of the image forming apparatus.

The structure of the scanner unit 201 will be described below using FIG. 5. Reference numeral 501 denotes a document table glass on which a document 502 to be scanned is placed. An illumination lamp 503 illuminates the document 502 with light, and the light reflected by the document 502 forms an image on a CCD 508 by a lens 507 via mirrors 504, 505, and 506. A first mirror unit 510 including the mirror 504 and illumination lamp 503, and a second mirror unit 511 including the mirrors 505 and 506 scan the entire surface of the document 502 while they move at velocities v and 1/2v, respectively. The first and second mirror units 510 and 511 are driven by a motor 509. The operations of the units 510 and 511 of the scanner unit 201 are controlled by a signal from a scanner controller unit 512. The scanner controller unit 512 performs operation control of the units 510 and 511 in accordance with an instruction from the apparatus controller 204.

[Processing in Scanner Controller Unit 512]

Figure 6:
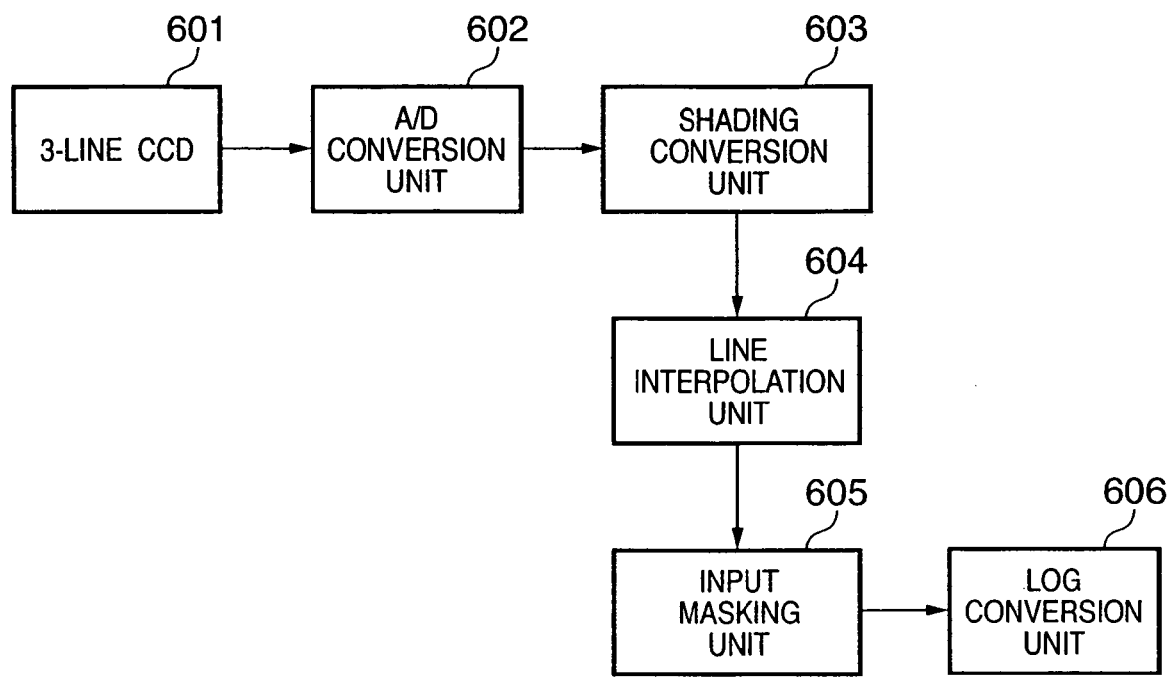
FIG. 6 is a block diagram showing the arrangement of a scanner controller in the image forming apparatus.

Image processing in the scanner controller unit 512 will be described below using FIG. 6. An input optical signal is converted into an electrical by a CCD sensor 601. The CCD sensor 601 includes RGB color line sensors, which input R/G/B image signals to an A/D conversion unit 602. The input image signals undergo gain adjustment and offset adjustment, and are then converted by an A/D converter into 8-bit digital image signals R0, G0, and B0. A shading correction (conversion) unit 603 applies known shading correction for respective colors using scanned signals of a reference white plate. Furthermore, since the color line sensors of the CCD sensor 601 are spaced by a predetermined distance from each other, their spatial deviations in the sub-scan direction are corrected by a line delay adjustment circuit (line interpolation unit) 604.

An input masking unit 605 converts a scan color space determined by the spectral characteristics of R/G/B filters of the CCD sensor 601 into an NTSC standard color space. That is, the input masking unit 605 converts the input signals (R0, G0, and B0) into standard signals (R, G, B) by making a 3×3 matrix operation using constants unique to the apparatus in consideration of various characteristics such as the sensitivity characteristics of the CCD sensor 601, the spectral characteristics of the illumination lamp, and the like. Furthermore, a luminance/density conversion unit (LOG conversion unit) 606 comprises a lookup table (LUT), which converts R, G, and B luminance signals into C1, M1, and Y1 density signals. The converted signals are output to the apparatus controller 204.

[Structure of Printer Unit 202]

Figure 7:
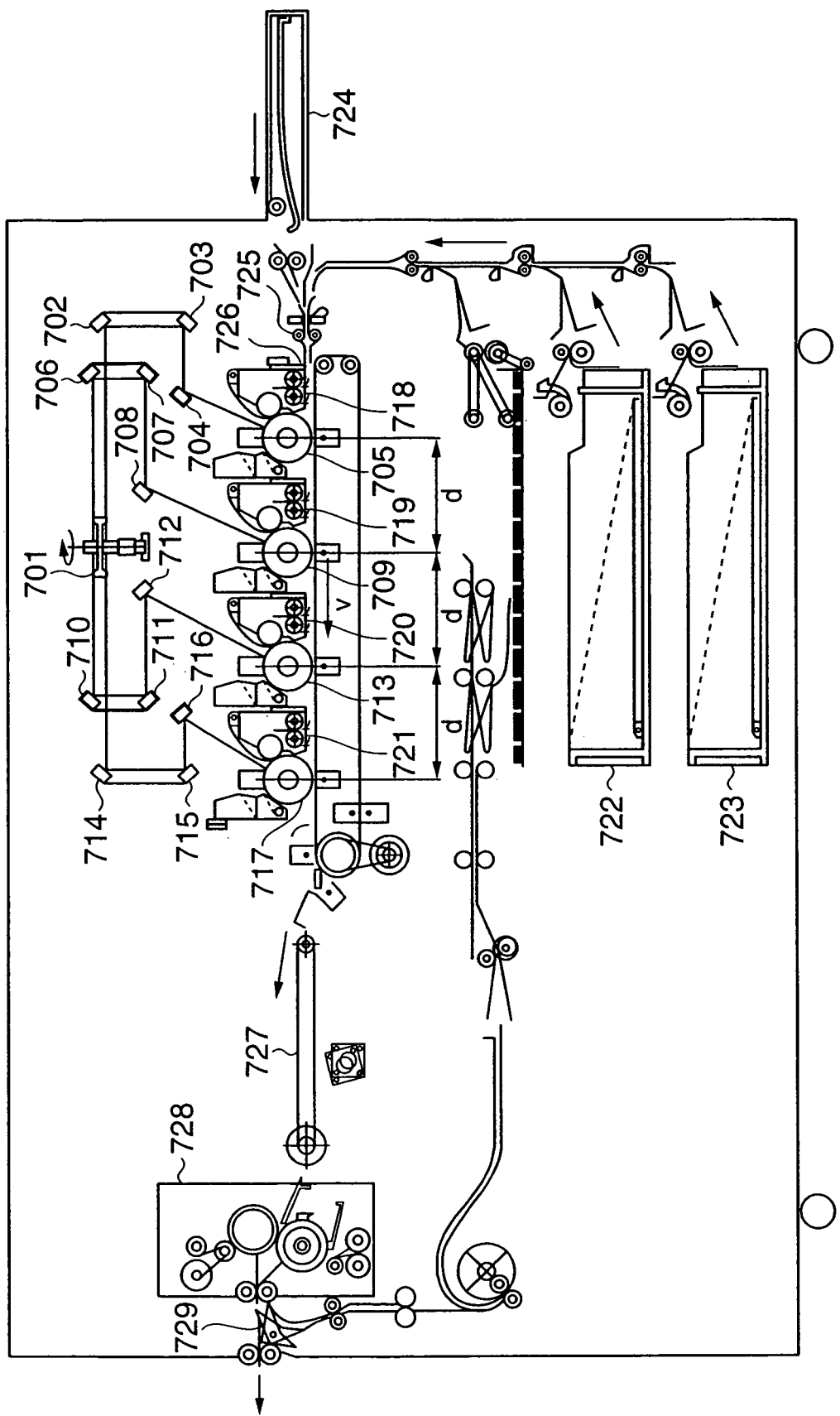
FIG. 7 is a schematic sectional view showing the structure of a printer unit of the image forming apparatus.

FIG. 7 is a schematic sectional view of the printer unit 202. Reference numeral 701 denotes a polygonal mirror which has a semiconductor laser driving unit, and receives four emitted laser beams. One of these laser beams scans a photosensitive drum 705 via mirrors 702, 703, and 704. The next laser beam scans a photosensitive drum 709 via mirrors 706, 707, and 708. The next laser beam scans a photosensitive drum 713 via mirrors 710, 711, and 712. The next laser beam scans a photosensitive drum 717 via mirrors 714, 715, and 716.

On the other hand, reference numeral 718 denotes a developer which supplies yellow (Y) toner, and forms a yellow toner image on the photosensitive drum 705 in accordance with the laser beam; 719, a developer which supplies magenta (M) toner, and forms a magenta toner image on the photosensitive drum 709 in accordance with the laser beam; 720, a developer which supplies cyan (C) toner, and forms a cyan toner image on the photosensitive drum 713 in accordance with the laser beam; and 721, a developer which supplies black (K) toner, and forms a black toner image on the photosensitive drum 717 in accordance with the laser beam. The toner images of these four colors (Y, M, C, K) are transferred onto a sheet, thus obtaining a full-color output image.

A sheet fed from one of sheet cassettes 722 and 723, and a manual insert tray 724 is attracted on and conveyed by a transfer belt 726 via registration rollers 725. In synchronism with the sheet feed timing, the toner images of the respective colors are developed on the photosensitive drums 705, 709, 713, and 717 in advance, and are transferred onto the sheet as the sheet is conveyed. The sheet on which the toner images of the respective colors have been transferred is conveyed by a conveyor belt 727, and the toner images are fixed on the sheet by a fixing device 728. The sheet which has left the fixing device 728 is temporarily guided downward by a flapper 729. After the trailing end of the sheet leaves the flapper 729, the sheet is switched back and exhausted. In this way, the sheet is exhausted facing down, and a correct page order is obtained when print processing is done in turn from the first page.

Note that the four photosensitive drums 705, 709, 713, and 717 are equally spaced at a distance d, and the sheet is conveyed by the conveyor belt 727 at a constant velocity v, so that the semiconductor lasers of the polygonal mirror 701 are driven in synchronism with this timing.

[Structure of Finisher Unit 205]

Figure 8:
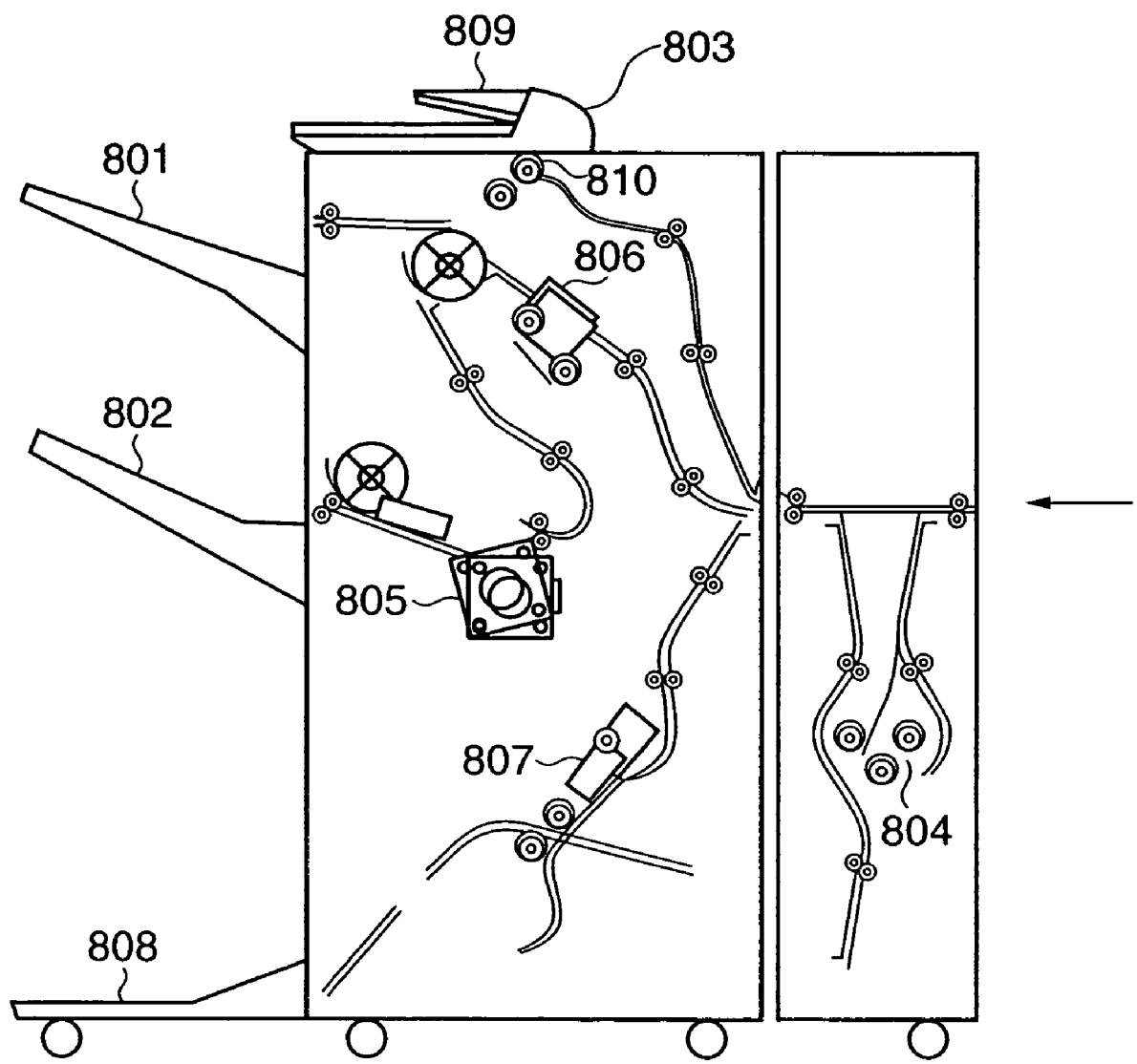
FIG. 8 is a sectional view showing the structure of a finisher unit of the image forming apparatus.

FIG. 8 is a schematic sectional view of the finisher unit 205. The sheet which has left the fixing unit 728 of the printer unit 202 enters the finisher unit 205. The finisher unit 205 has a sample tray 801 and stack tray 802, which are switched to receive exhausted sheets in correspondence with the job type and the number of sheets to be exhausted.

There are two sorting methods: sorting can be done by a bin sort method which has a plurality of bins and sorts sheets to respective bins, and a shift sort method which shifts bins (or tray) in the back-and-forth direction and sorts output sheets for respective jobs using a digital sort function (to be described below). The digital sort function is called "collate". If the apparatus has a large-capacity memory, the digital sorting function can be supported using a so-called collate function that changes the buffered page order and exhaust order using this buffer memory. Next, a group function sorts sheets for respective pages in place of sorting for respective jobs of the sorting function.

Furthermore, when sheets are exhausted onto the stack tray 802, sheets before exhaust are stacked for respective jobs, and can be bound by a stapler 805 immediately before they are exhausted.

In addition, a Z-folding device 804 for folding each sheet in a Z-shape, and a puncher 806 for punching two (or three)

holes for a file are equipped before the two trays, and execute respective processes in accordance with the job type.

Furthermore, a saddle stitcher 807 executes a process for forming a booklet such as a weekly magazine, brochure, or the like by center-folding sheets by nipping their central portion by rollers after the central portion of the sheets are bound at two positions. Sheets which are bound by the saddle stitcher 807 are exhausted onto a booklet tray 808.

Also, although not shown in FIG. 8, a bind process using a glue for bookbinding, a trim process for trimming the end faces of the side opposite to the binding side, or the like may be added.

An inserter 803 is used to feed a sheet set on a tray 809 to one of the trays 801, 802, and 808 without going through the printer. A sheet set on the inserter 803 can be inserted between those which are fed into the finisher unit 205. Assume that the user sets sheets facing up on the tray 809 of the inserter 803, and sheets are fed in turn from the uppermost one by pickup rollers 810. Therefore, a sheet from the inserter 803 is conveyed to the tray 801 or 802 intact, and is exhausted facing down. When a sheet is fed to the saddle stitcher 807, it is temporarily fed to the puncher 806 side and is then switched back to adjust the orientation of the face.

<Flow of Processing in Image Forming System>

Figure 9:
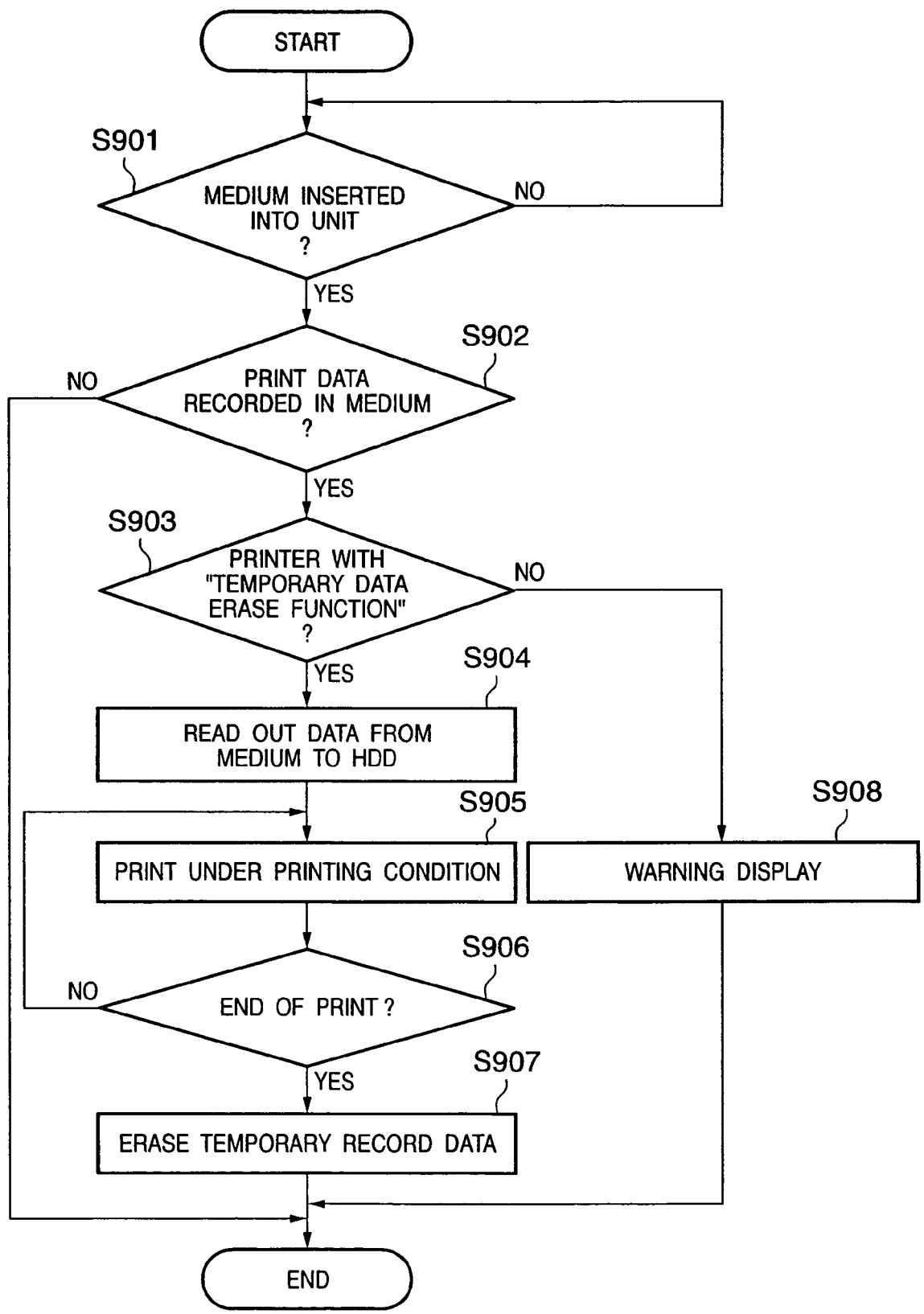
FIG. 9 is a flowchart showing the flow of processing in the image forming system according to the first embodiment of the present invention.

The direct print operation from a removable medium in consideration of data leakage to a third party as a characteristic feature of the present invention will be described in detail below using the flowchart of FIG. 9.

In step S901, the user inserts the removable medium 106 that saves print data into the removable media drive unit 105.

In step S902, the removable media drive unit 105 detects the removable medium 106 and accesses the medium to check if print data are recorded. If no print data is recorded, the processing ends. On the other hand, if print data are recorded, the flow advances to step S903.

In step S903, the removable media drive unit 105 sends, to the image forming apparatus 101, a query as to whether or not to have a temporary record data erase function. If the image forming apparatus 101 has the temporary record data erase function, the flow advances to step S904 to continue print processing. Note that the temporary record data erase function means a function of completely erasing print data which are temporarily recorded when the image forming apparatus 101 executes image forming processing.

For example, a case will be exemplified below wherein the direct print operation from the removable medium 106 is to be executed. After print data in the removable medium 106 are recorded in the HDD 305 via the removable media drive unit 105 and external I/F 310, they are output to the printer unit 202 via the image memory 304 and image processor 303, and are then printed. At this time, the print data (temporary record data) remain after they are printed, unless especially intended processing is done. For this reason, if a third party accesses the HDD 305 or image memory 304 by an arbitrary method, leakage of print data occurs. The temporary record data erase function executes processing for completely erasing print data temporarily recorded in the HDD 305 and image memory 304 after print processing, so as to prevent such data leakage. As an erase method, a method of overwriting the data area of temporary record print data with zeros, a method of overwriting that area with a random number, and the like are available.

In step S904, the removable media drive unit 105 reads out print data recorded in the removable medium 106, and records them in the HDD 305 via the external I/F 310.

In step S905, the print data recorded in the HDD are printed under predetermined printing conditions. Note that the printing conditions may be set in advance in the image forming apparatus 101 or may be embedded in the print data. Alternatively, the user may set the printing conditions from the operation unit 203 attached to the image forming apparatus 101.

If it is determined in step S906 that print data to be printed of those which are recorded in the HDD 305 still remain, the flow returns to step S905 to repeat the print processing. If all print data have been printed, the flow advances to step S907.

In step S907, the temporary record data areas of the HDD 305 and image memory 304 used in the print processing undergo data complete erase processing. After that, the print processing ends.

On the other hand, if it is determined in step S903 that the image forming unit 101 does not have any temporary record data erase function, as a result of the query about the presence/absence of the temporary record data erase function, which is sent from the removable media drive unit 105 to the image forming apparatus 101, the flow advances to step S908 to abort the print processing.

In step S908, the removable media drive unit 105 sends, to the image forming apparatus 101, a message indicating that it does not read out print data from the removable medium and aborts the print processing. Upon reception of this message, the image forming apparatus displays a warning dialog that informs the user that the print processing is aborted on the operation unit 203.

As described above, according to the image forming system of this embodiment, upon executing the direct print operation using a removable medium, the removable media drive unit sends to the image forming apparatus a query about the presence/absence of the temporary record data erase function, and the print processing in the image forming apparatus is then started.

For this reason, print data of the direct print operation are never transmitted to the image forming apparatus without the temporary record data erase function, and print data recorded in a temporary recording device (HDD, memory, or the like) can be prevented from being leaked to a third party unlike in the prior art.

Second Embodiment

In the first embodiment, when the image forming apparatus has no temporary record data erase function, a warning display is made, and the direct print operation is inhibited. However, print data to be directly printed include those which have low confidentiality, and even when such print data is printed, its print processing is denied due to the absence of the temporary record data erase function in the image forming apparatus, resulting in inconvenience for the user. For this reason, in this embodiment, even when the image forming apparatus does not have any temporary record data erase function, the direct print processing can be continued on the basis of a user's instruction. Details of this embodiment will be explained below using FIG. 10.

Figure 10:
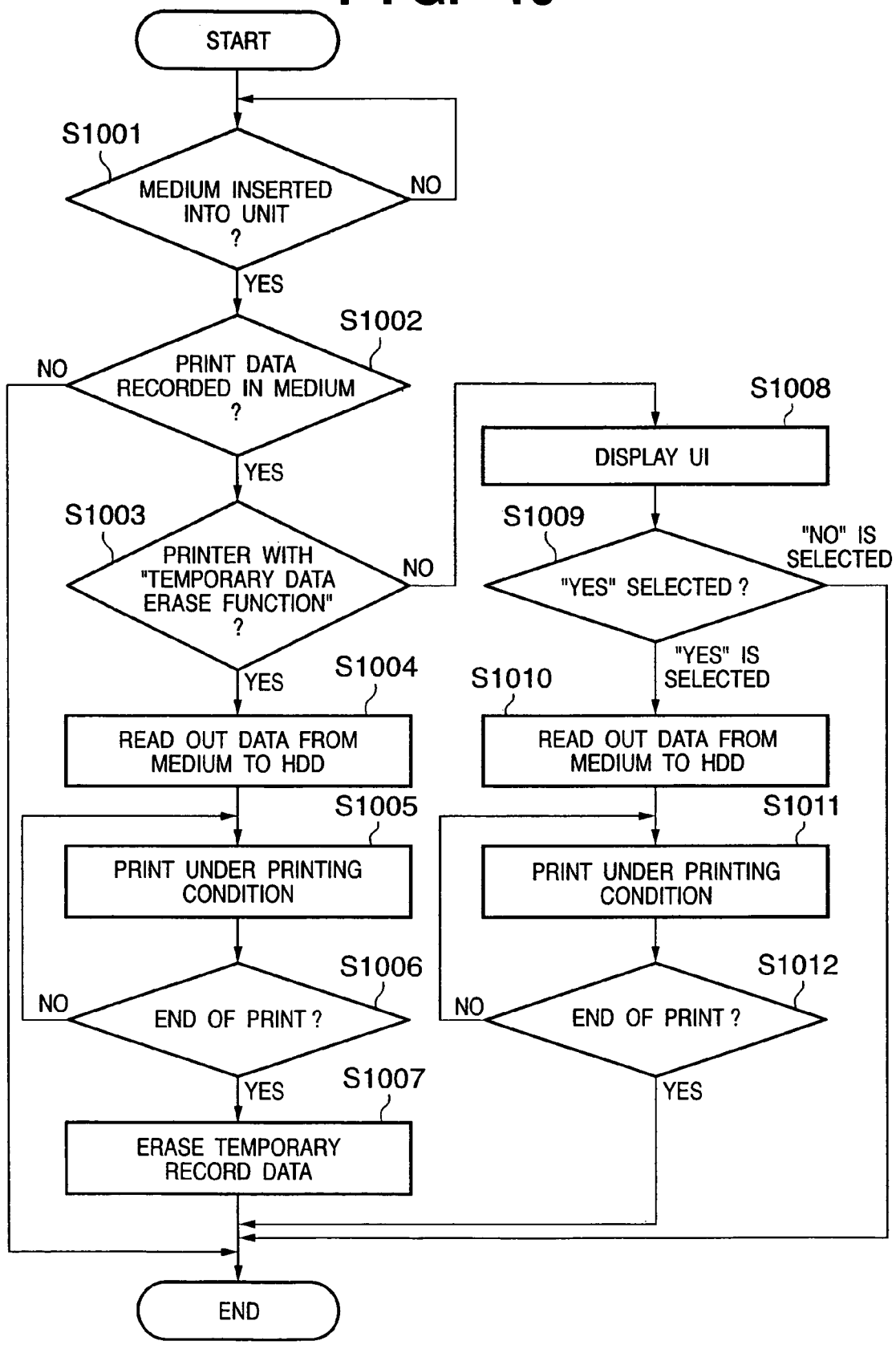
FIG. 10 is a flowchart showing the flow of processing in the image forming system according to the second embodiment of the present invention.

FIG. 10 is a flowchart showing the flow of the direct print processing executed when the image forming apparatus 101 does not have any temporary record data erase function and the control prompts the user to select whether or not the subsequent processing is to be proceeded.

In step S1001, the user inserts the removable medium 106 that saves print data into the removable media drive unit 105.

In step S1002, the removable media drive unit 105 detects the removable medium 106 and accesses the medium to check if print data are recorded. If no print data is recorded, the processing ends. On the other hand, if print data are recorded, the flow advances to step S1003.

In step S1003, the removable media drive unit 105 sends, to the image forming apparatus 101, a query as to whether or not to have a temporary record data erase function. If the image forming apparatus 101 has the temporary record data erase function, the flow advances to step S1004 to continue print processing.

In step S1004, the removable media drive unit 105 reads out print data recorded in the removable medium 106, and records them in the HDD 305 via the external I/F 310.

In step S1005, the print data recorded in the HDD are printed under predetermined printing conditions. Note that the printing conditions may be set in advance in the image forming apparatus 101 or may be embedded in the print data. Alternatively, the user may set the printing conditions from the operation unit 203 attached to the image forming apparatus 101.

If it is determined in step S1006 that print data to be printed of those which are recorded in the HDD 305 still remain, the flow returns to step S1005 to repeat the print processing. If all print data have been printed, the flow advances to step S1007.

In step S1007, the temporary record data areas of the HDD 305 and image memory 304 used in the print processing undergo data complete erase processing. After that, the print processing ends.

On the other hand, if it is determined in step S1003 that the image forming unit 101 does not have any temporary record data erase function, as a result of the query about the presence/absence of the temporary record data erase function, which is sent from the removable media drive unit 105 to the image forming apparatus 101, the flow advances to step S1008.

In step S1008, the image forming apparatus 101 displays, on the operation unit 203, a UI that prompts the user to select whether or not to continue the print processing. FIG. 11 shows that UI.

If it is determined in step S1009 that the user selects "YES", the flow advances to step S1010 to continue the print processing.

In step S1010, the removable media drive unit 105 reads out print data recorded in the removable medium 106, and records them in the HDD 305 via the external I/F 310.

In step S1011, the print data recorded in the HDD are printed under predetermined printing conditions. Note that the printing conditions may be set in advance in the image forming apparatus 101 or may be embedded in the print data. Alternatively, the user may set the printing conditions from the operation unit 203 attached to the image forming apparatus 101.

If it is determined in step S1012 that print data to be printed of those which are recorded in the HDD 305 still remain, the flow returns to step S1011 to repeat the print processing. If all print data have been printed, the print processing ends.

On the other hand, if it is determined in step S1009 that the user selects "NO", print data is inhibited from being read out from the removable medium, and the print processing is aborted.

As can be seen from the above description, according to this embodiment, even when the image forming apparatus does not have any temporary record data erase function, direct print processing can be continued on the basis of a user's instruction. As a result, print data which has low confidentiality and does not pose any problem if it is leaked to a third party can undergo direct print processing on the basis of a user's instruction even when the image forming apparatus does not have any temporary record data erase function, thus improving user's convenience.

Third Embodiment

In the first embodiment, even when the image forming apparatus has the temporary record data erase function, only temporary record data in the image forming apparatus are erased after completion of the direct print processing. However, the present invention is not limited to such specific embodiment, and print data in the removable medium may be erased. Details of this embodiment will be explained below using FIG. 12.

FIG. 12 is a flowchart showing the flow of the processing when a function of erasing print data in the removable medium 106 after completion of the direct print processing is added in consideration of the convenience for the user who executes the direct print processing.

In step S1201, the user inserts the removable medium 106 that saves print data into the removable media drive unit 105.

In step S1202, the removable media drive unit 105 detects the removable medium 106 and accesses the medium to check if print data are recorded. If no print data is recorded, the processing ends. On the other hand, if print data are recorded, the flow advances to step S1203.

In step S1203, the removable media drive unit 105 sends, to the image forming apparatus 101, a query as to whether or not to have a temporary record data erase function. If the image forming apparatus 101 has the temporary record data erase function, the flow advances to step S1204 to continue print processing.

In step S1204, the removable media drive unit 105 reads out print data recorded in the removable medium 106, and records them in the HDD 305 via the external I/F 310.

In step S1205, the print data recorded in the HDD are printed under predetermined printing conditions. Note that the printing conditions may be set in advance in the image forming apparatus 101 or may be embedded in the print data. Alternatively, the user may set the printing conditions from the operation unit 203 attached to the image forming apparatus 101.

If it is determined in step S1206 that print data to be printed of those which are recorded in the HDD 305 still remain, the flow returns to step S1205 to repeat the print processing. If all print data have been printed, the flow advances to step S1207.

In step S1207, the temporary record data areas of the HDD 305 and image memory 304 used in the print processing undergo data complete erase processing. After that, the flow advances to step S1208.

In step S1208, upon completion of the print processing, the image forming apparatus 101 sends a print completion message to the removable media drive unit 105. Upon reception of this message, the removable media drive unit 105 erases print data in the removable medium 106.

On the other hand, if it is determined in step S1203 that the image forming unit 101 does not have any temporary record data erase function, as a result of the query about the presence/absence of the temporary record data erase function, which is sent from the removable media drive unit 105 to the image forming apparatus 101, the flow advances to step S1209 to abort the print processing.

In step S1209, the removable media drive unit 105 sends, to the image forming apparatus 101, a message indicating that it does not read out print data from the removable medium and aborts the print processing. Upon reception of this message, the image forming apparatus displays a warning dialog that informs the user that the print processing is aborted on the operation unit 203.

As can be seen from the above description, according to this embodiment, upon completion of the direct print processing, not only print data in the image forming apparatus but also those in the removable medium can be erased, thus reliably preventing leakage of print data to a third party.

Fourth Embodiment

In the first embodiment, upon erasing temporarily recorded print data, the method of overwriting the data area of the temporarily recorded print data with zeros and the method of overwriting that area with a random number have been exemplified. However, since such erase method takes long, the throughput until completion of the print processing drops compared to a case without any erase processing.

Hence, in this embodiment, when the image forming apparatus 101 has the temporary record data erase function, the temporary record data erase function is disabled in a normal print mode, and is enabled when a query about the temporary record data erase function is received. In this way, only when the temporary record data erase processing is required, temporary record data are erased. On the other hand, when the temporary record data erase processing is not required, the temporary record data erase function is disabled, thus avoiding unnecessary throughput drop. Details of this embodiment will be explained below using FIG. 13.

In step S1301, the user inserts the removable medium 106 that saves print data into the removable media drive unit 105.

In step S1302, the removable media drive unit 105 detects the removable medium 106 and accesses the medium to check if print data are recorded. If no print data is recorded, the processing ends. On the other hand, if print data are recorded, the flow advances to step S1303.

If the image forming apparatus 101 receives a print start message without receiving any query about the temporary record data erase function from the removable media drive unit 105 in step S1303, the flow advances to step S1304.

In step S1304, the removable media drive unit 105 reads out print data recorded in the removable medium 106, and records them in the HDD 305 via the external I/F 310.

In step S1305, the print data recorded in the HDD are printed under predetermined printing conditions. Note that the printing conditions may be set in advance in the image forming apparatus 101 or may be embedded in the print data. Alternatively, the user may set the printing conditions from the operation unit 203 attached to the image forming apparatus 101.

If it is determined in step S1306 that print data to be printed of those which are recorded in the HDD 305 still remain, the flow returns to step S1305 to repeat the print processing. If all print data have been printed, the print processing ends without the temporary record data erase processing.

On the other hand, if the image forming apparatus 101 receives a query about the temporary record data erase function from the removable media drive unit 105 in step S1303, the flow advances to step S1307.

In step S1307, the removable media drive unit 105 sends, to the image forming apparatus 101, a query as to whether or not to have a temporary record data erase function. If the image forming apparatus 101 has the temporary record data erase function, the flow advances to step S1308 to continue print processing.

In step S1308, the removable media drive unit 105 reads out print data recorded in the removable medium 106, and records them in the HDD 305 via the external I/F 310.

In step S1309, the print data recorded in the HDD are printed under predetermined printing conditions. Note that the printing conditions may be set in advance in the image forming apparatus 101 or may be embedded in the print data. Alternatively, the user may set the printing conditions from the operation unit 203 attached to the image forming apparatus 101.

If it is determined in step S1310 that print data to be printed of those which are recorded in the HDD 305 still remain, the flow returns to step S1309 to repeat the print processing. If all print data have been printed, the flow advances to step S1311.

In step S1311, the temporary record data areas of the HDD 305 and image memory 304 used in the print processing undergo data complete erase processing. After that, the print processing ends.

On the other hand, if it is determined in step S1307 that the image forming unit 101 does not have any temporary record data erase function, as a result of the query about the presence/absence of the temporary record data erase function, which is sent from the removable media drive unit 105 to the image forming apparatus 101, the flow advances to step S1312 to abort the print processing.

In step S1312, the removable media drive unit 105 sends, to the image forming apparatus 101, a message indicating that it does not read out print data from the removable medium and aborts the print processing. Upon reception of this message, the image forming apparatus displays a warning dialog that informs the user that the print processing is aborted on the operation unit 203.

As can be seen from the above description, according to this embodiment, only when a query about the temporary record data erase function is received upon executing the direct print processing, the temporary record data erase function is enabled, thus avoiding any throughput drop of the direct print processing when temporary record data need not be erased.

As described above, the arrangement according to each of the embodiments of the present invention can prevent data in a predetermined recording medium (storage unit) such as a removable medium or the like from being held without being erased against user's will after image formation.

To this end, as described above, in each of the embodiments of the present invention, a control unit confirms information that pertains to an image forming apparatus which can print data in a predetermined recording medium such as a removable medium or the like in an image forming system that includes the image forming apparatus. When the image forming apparatus of interest is the one which has a predetermined function, the control unit permits the image forming apparatus to execute print processing of the data in the recording medium.

A practical example will be described below. When the image forming apparatus of interest is the one which has an erase function that executes erase processing of printed data as the predetermined function, the control unit permits the image forming apparatus to execute print processing of the data in the recording medium.

In other words, of an image forming apparatus of a first type having the erase function and that of a second type having no such function, assume that the control unit confirms that the image forming apparatus of interest is that of the first type. In this case, the control unit permits the image forming apparatus to execute print processing of the data in the recording medium.

Under the assumption of such arrangement, when it is confirmed that the image forming apparatus of interest is the one having no erase function, the control unit can inhibit the image forming apparatus from executing print processing of the data in the recording medium.

Alternatively, when it is confirmed that the image forming apparatus of interest is the one having no erase function, the control unit notifies the user of a predetermined warning. For example, when that confirmation is made, the control unit controls a user interface unit to make a warning display that pertains to the print processing of the data in the recording medium by the image forming apparatus.

Alternatively, when it is confirmed that the image forming apparatus of interest is the one having no erase function, the control unit respects user's intention. For example, when that confirmation is made, the control unit allows the user himself or herself to select via the user interface unit whether or not the print processing of the data in the recording medium is to be executed by the image forming apparatus.

On the other hand, when it is confirmed that the image forming apparatus of interest is the one which has the erase function as the predetermined function, the control unit permits the image forming apparatus to execute print processing of the data in the recording medium. After execution of the print processing of the data in the recording medium, the control unit controls the image forming apparatus to execute the erase process of the data.

More specifically, when the image forming apparatus of interest is the one which has the erase function as the predetermined function, the control unit controls to record the data in the recording medium on a recording unit such as a hard disk or the like of the image forming apparatus. Then, the control unit controls the image forming apparatus to execute the print processing of the data in the recording unit. Upon completion of the print processing of the data, the control unit controls to erase the data in the recording unit from it.

Each of the embodiments of the present invention adopts such various schemes. As a result, the above effects can be obtained, and various needs from the user can be flexibly satisfied.

Other Embodiments

Note that the present invention may be applied to either a system or integrated apparatus constituted by a plurality of devices (e.g., a host computer, interface device, reader, and the like), or an apparatus consisting of a single equipment.

The objects of the present invention are also achieved by supplying a recording medium, which records a program code of a software program that can implement the functions of the above-mentioned embodiments to the system or apparatus, and reading out and executing the program code recorded in the recording medium by a computer (or a CPU or MPU) of the system or apparatus.

In this case, the program code itself read out from the recording medium implements novel functions of the present invention, and the recording medium which records the program code constitutes the present invention.

As the recording medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS or the like running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the recording medium is written in a memory of the extension board or unit.

Note that the present invention can be applied to a case wherein a program is delivered from a recording medium that records the program code of software which implements the functions of the aforementioned embodiments to a demander via a communication line such as PC communications.

The present invention is not limited to the above embodiments and various changes and modifications can be made within the spirit and scope of the present invention. Therefore to apprise the public of the scope of the present invention, the following claims are made.

CLAIM OF PRIORITY

This application claims priority from Japanese Patent Application No. 2004-264597 filed on Sep. 10, 2004, which is hereby incorporated by reference herein.

What is claimed is:

1. An image forming system including an image forming apparatus which can execute print processing, and an information processing apparatus which is connected to the image forming apparatus to able to communicate with the image forming apparatus, and transmits data read out from a removable medium to the image forming apparatus,
    wherein said information processing apparatus comprises:
    a detection unit configured to detect if data recorded in the removable medium is ready to be read out;
    a confirmation unit configured to confirm, after detection by said detection unit, whether or not data temporarily held by the image forming apparatus upon print processing can be erased by the image forming apparatus after print processing;
    a permission unit configured to permit, when said confirmation unit confirms that the data can be erased, an execution of the print processing of data read out from removable medium by the image forming apparatus; and
    an output unit configured to output, when said confirmation unit confirms that the data cannot be erased, a signal used to display a message indicating that print processing is aborted on the image forming apparatus.

2. The system according to claim 1, wherein when said confirmation unit confirms that the data cannot be erased, said output unit further outputs a signal used to display, on the image forming apparatus, a message that asks a user whether or not to permit the execution of print processing using the data recorded in the removable medium.

3. The system according to claim 1, wherein said information processing apparatus further comprises an erase unit configured to erase, when the data temporarily held by the image forming apparatus upon print processing is erased by the image forming apparatus after print processing, the data recorded in the removable medium.

4. An image forming system including an image forming apparatus which can execute print processing, and an information processing apparatus which is connected to the image forming apparatus to able to communicate with the image forming apparatus, and transmits data read out from a removable medium to the image forming apparatus, wherein said information processing apparatus comprises:
a detection unit configured to detect if data recorded in the removable medium is ready to be read out; and
a query unit configured to send, to the image forming apparatus after detection of the detection unit, a query as to whether or not data temporarily held by the image forming apparatus upon print processing can be erased by the image forming apparatus after print processing, and the image forming apparatus comprises:
a reply unit configured to return information indicating whether or not the data can be erased to the information processing apparatus in response to the query from said query unit;
an executing unit configured to execute, when said replay unit returns information indicating that the data can be erased, the print processing of data read out from the removable medium; and
a display unit configured to display, when said replay unit returns information indicating that the data cannot be erased, a message indicating that image formation is aborted.

5. The system according to claim 4, wherein when the information indicating that the data cannot be erased is received from the image forming apparatus, the information processing apparatus inhibits the data recorded in the removable medium from reading out.

6. The system according to claim 4, wherein when said replay unit returns information indicating that the data cannot be erased, said display unit further displays a message that asks a user whether or not to execute print processing using the data recorded in the removable medium.

7. The system according to claim 6, wherein when the user issues an instruction that instructs to execute print processing, the information processing apparatus reads out data recorded in the removable medium, and the image forming apparatus executes print processing on the basis of the readout data.

8. The system according to claim 4, wherein said information processing apparatus further comprises an erase unit configured to erase, when the data temporarily held by the image forming apparatus upon print processing is erased by the image forming apparatus after print processing, the data recorded in the removable medium.

9. The system according to claim 4, wherein when the user issues an instruction that instructs to execute print processing after detection of said detection unit and before said query unit sends a query, the image forming apparatus operates not to erase the data temporarily held upon print processing after print processing.

10. A job processing method in an image forming system including an image forming apparatus which can execute print processing, comprising:
a detection step of detecting if data recorded in the removable medium is ready to be read out;
a confirmation step of confirming, after detection in the detection step, whether or not data temporarily held by the image forming apparatus upon print processing can be erased by the image forming apparatus after print processing;
a transmission step of transmitting, when it is confirmed in the confirmation step that the data can be erased, data read out from a removable medium to the image forming apparatus;
a permitting step of permitting, when it is confirmed in the confirmation step that the data can be erased, an execution of print processing of data read out from the removable medium by the image forming apparatus;
an output step of outputting, when it is confirmed in the confirmation step that the data cannot be erased, a signal used to display a message indicating that print processing is aborted on the image forming apparatus;
wherein the output step includes a step of further outputting, when it is confirmed in the confirmation step that the data cannot be erased, a signal used to display, on the image forming apparatus, a message that asks a user whether or not to execute print processing using the data recorded in the removable medium.

11. A job processing method in an image forming system including an image forming apparatus which can execute print processing, comprising:
a detection step of detecting if data recorded in the removable medium is ready to be read out;
a confirmation step of confirming, after detection in the detection step, whether or not data temporarily held by the image forming apparatus upon print processing can be erased by the image forming apparatus after print processing;
a transmission step of transmitting, when it is confirmed in the confirmation step that the data can be erased, data read out from a removable medium to the image forming apparatus;
a permitting step of permitting, when it is confirmed in the confirmation step that the data can be erased, an execution of print processing read out from the removable medium by the image forming apparatus;
an output step of outputting, when it is confirmed in the confirmation step that the data cannot be erased, a signal used to display a message indicating that print processing is aborted on the image forming apparatus; and
an erase step of erasing, when the data temporarily held by the image forming apparatus upon print processing is erased by the image forming apparatus after print processing, the data recorded in the removable medium.

* * * * *